United States Patent Office 3,476,856
Patented Nov. 4, 1969

3,476,856
PROCESS FOR PRODUCING THE SODIUM SALT OF NYSTATIN AND LEVORIN
Valter Osvaldovich Kulbakh and Marija Pavlovna Karpenko, Leningrad, U.S.S.R., assignors to Leningradsky Nauchno-Issledoratelsky Institute Antibiotikov, Leningrad, U.S.S.R.
No Drawing. Filed May 5, 1964, Ser. No. 365,181
Int. Cl. C07g *11/00;* A61k *21/00*
U.S. Cl. 424—123
8 Claims

ABSTRACT OF THE DISCLOSURE

A process for producing the sodium salt of nystatin and levorin comprising potentiometrically titrating a solution of said antibiotics in an anhydrous alcoholic medium with an alcoholic solution of a sodium alcoholate to a pH of at most 10.2, filtering, then concentrating the filtrate and precipitating the sodium salt of the antibiotic by treatment with an anhydrous solvent. The precipitate is then washed and dried under reduced pressure.

---

Up to now attempts to solve the problem of obtaining soluble sodium salts of polyene antibiotics which contain a carboxyl group have been unsuccessful, inasmuch as salt formation by the usual method in aqueous solutions is impossible since the pH of soluble salts of tetraenes synthesized in this way is greater than 10.1, while the pH of heptaene salts is greater than 11. It follows that these salts are not neutral, and for this reason, as well as because of their instability, cannot be administered intravenously. Because of the instability of the macrolide lactone ring of polyene antibiotics, it is completely hydrolyzed in 0.01 N sodium hydroxide solution, i.e., at pH 12, within 3 hours with the loss of antibiotic activity, and when the reaction of salt formation is carried out in an anhydrous medium, hydrolysis takes place through the water formed in the reaction.

The possibility of the semi-synthetic production of soluble antifungal antibiotic preparations by acylation of polyenes, for example, in the form of succinates is known. However, in this case only the derivatives of heptaene antibiotics possess biological activity, and the latter is reduced 2 to 16 times as compared to the initial heptaene, for example, perimycin.

The possibility is also known of obtaining soluble salts of amphoteric polyene antibiotics, for example, nystatin, after blocking the nitrogen atom by acetylation. However, the N-acetyl derivatives of the tetraene antibiotics having a high pH are also subject to hydrolysis and due to the accompanying rupture of the macrolide lactone ring lose antibiotic activity, whereas the N-acetyl derivatives of heptaenes, for example, candicidin, retain their activity when acetylation is carried out at a low temperature in the medium of absolute methanol.

It follows that though attempts have been made to eliminate the above-mentioned difficulties and deficiencies in producing soluble salts of polyene antibiotics, they were unsuccessful in respect to tetraenes, but we successfully solved this problem and brought it to practical realization. We have now established the fact that the liberation of water of reaction during the formation of polyene salts can be prevented and the constant presence of an anhydrous medium during the entire operation achieved by using sodium alcoholate, preferable sodium butylate, instead of sodium hydroxide, which in turn excludes the possibility of hydrolysis of the macrolide lactone ring of the polyene. The use of sodium butylate, which is a considerably weaker base than sodium methylate and is incomparably simpler to prepare and safer than the latter, lessens the possibility of rupture of the macrolide lactone ring, thus ensuring a better yield and higher quality of the preparation. Carrying out the operation of salt formation by potentiometric titration of a solution of the polyene in an anhydrous alcoholic medium, preferably methanol medium, by means of a solution of sodium alcoholate, using an alcoholic, preferably methanol solution of sodium butylate, as the titrant with vigorous stirring at room temperature to a pH not higher than 10.1, i.e., in mild conditions, still further reduces the possibility of rupture of the macrolide lactone ring of the polyenes.

Broadly, this invention is intended to provide a simpler, more economic and safer method of producing soluble antifungal polyene preparations, applicable to all polyene antibiotics, free from the above-mentioned deficiencies, and ensuring a satisfactory yield of soluble sodium salts of polyenes, more particularly tetraenes and heptaenes, which contain a carboxyl group.

According to the preferred embodiment of the invention, salt formation is carried out in an anhydrous methanol medium by rapid potentiometric titration to a pH of not more than 10.1 adding to a 0.8% solution or suspension of the polyene a calculated volume of the titrant in the form of a 0.1 N solution of sodium butylate in dry methanol at room temperature with vigorous stirring, using a potentiometer with glass electrode for control. The insoluble impurities are removed by filtration and the filtrate evaporated in a stream of nitrogen to ⅛–1/10 of the initial volume, after which the precipitate of inactive impurities is removed by filtration. First the impurities in the concentrated solution are next precipitated fractionally and then the sodium salt of the polyene precipitated from the filtrate by adding five times the volume of ethyl acetate. The precipitate of the sodium salt of the polyene is separated, washed on the filter with dry acetone or methylene chloride and dried in a vacuum drying-oven at a temperature not higher than 25° C. and a pressure of 50 mm. Hg. The stability of the preparation in storage can be raised by subjecting the concentrated aqueous solutions of the sodium salts of the polyenes to lyophilic drying. The invention is specially intended for obtaining water-soluble sodium salts of polyene antibiotics.

An object of the invention is to provide a general economic and safe method of producing soluble sodium salts of polyene antibiotics. An advantage of the invention is the possibility of using polyene antibiotics in the form of their water-soluble sodium salts in diseases in which the free polyenes have little or no clinical effect when administered orally because of their low solubility and poor absorption from the gastro-intestinal tract. Such diseases include pulmonary and generalized moniliasis, moniliasis of the mucosa of the mouth, nasopharynx and genitals, aspergillosis and coccidiosis, as well as cases of monilia carrying. The sodium salts of polyene antobiotics can be used in these cases for aerosol therapy, which is comparable in effect to intravenous administration. Inhalation of an aqueous solution of the sodium salts of polyene antibiotics, particularly nystatin, gives a concentration in the blood ten times higher than the fungistatic value. Absorption of the sodium salts of the polyene antibiotics, in particular nystatin, can also be achieved by rectal administration or oral administration in the form of tablets which dissolve in the intestine, or by oral administration with milk; in the later case the nystatin is precipitated by the acid gastric juice in the form of highly dispersed particles possessing a high specific surface, thus ensuring better absorption.

Another object of the present invention is to lower the toxicity of polyenes, the same as when the N-acyl derivatives are prepared. Thus, when the sodium salt of nystatin is prepared the toxicity is lowered by 40% on the basis of the milligram toxicity. For white mice the medial lethal dose ($LD_{50}$) of the water-soluble sodium salt of nystatin administered intraperitoneally is 35.7 mg./kg., while for nystatin it is 18 mg./kg. This is achieved by removing the toxic impurities by filtration after salt formation, concentration, fractional precipitation and removal of inactive albonurcin from the preparation by washing with acetone or methylene chloride.

Another advantage of the invention lies in the more effective use of the water-soluble sodium salts of the polyene antibiotics, particularly nystatin, as compared to the free polyenes, which are insoluble and therefore poorly suitable for preventing yeast and fungal infection when growing pure cultures of tissues in the production of vaccines against poliomyelitis, measles, whooping cough, influenza and other virus diseases, and also when preparing nutrient media for microbiological and virusological investigations and for growing trichomonas. The use of nystatin in these cases is not always practicable due to its insolubility in water, high toxicity, especially for young, growing cultures and to the inaccuracy of dosage of the insoluble preparation. Besides, the presence of the suspension hampers observation of the culture and control of the sterility of the medium. The use of the sodium salt of nystatin eliminates these deficiencies. Still another advantage of the invention is the reduction of the therapeutic dose and lowering of treatment costs. Thus, the effective dose of the sodium salt of nystatin when administered by inhalation is only 150,000 units, which is only one-twentieth of the daily dose of nystatin—3,000,000–4,000,000 units—which is ineffective in cases of aspergillosis and pulmonary moniliasis. Taking into account spraying losses and losses during synthesis, there is a five-fold economy of nystatin and a corresponding lowering of the cost of the course of treatment.

Another advantage of the invention which should be noted is the possibility of rectal administration of the sodium salt of nystatin in combination with oral administration of the salt or free nystatin in treating coccidiosis, a widespread disease among cattle and poultry, as well as the possibility of its oral administration for the prevention of coccidia carrying. Up till now there have been no sufficiently effective agents for the treatment of coccidiosis. When treatment with the sodium salt of nystatin is given. 100% recovery of animals occurs in 5–6 days and the 21% loss of calves is eliminated.

The application of the sodium salt of nystatin to prevent fungal and yeast contamination when growing pure tissue cultures in the production of vaccines and sera and in microbiological and virusological investigations eliminates rejects as a consequence of the unsterility of media or processes, involving the loss of expensive components of nutrient media.

It is likewise possible to use the sodium salts of nystatin and other polyene antibiotics, which are less toxic than the free polyenes, to arrest fermentation of the grape must in the production of half-sweet wines and for long-term storage of fruit, vegetables and other agricultural products.

In accordance with the above-mentioned and other objects and advantages, the invention comprises a new method of producing soluble sodium salts of polyene antibiotics, more particularly nystatin and levorin, intended for local, inhalation and intravenous administration, as well as for virusological work, as described here and below and referred to in the appended claims.

Other objects and advantages of this invention will be apparent from the following detailed description.

Broadly, this invention provides a general method of producing water-soluble salts of polyene antibiotics which contain a carboxyl group, in conditions excluding or lessening the possibility of rupture of the macrolide lactone ring with which the antibiotic activity of the polyenes is associated, by titration in solution in an anhydrous medium with a solution of a more weakly basic alcoholate, specifically sodium butylate. In the preferred embodiment of the invention a 0.8–1% solution of the polyene is titrated with 0.1 N sodium butylate solution, using methanol, which is more easily freed from water, as the alcoholic medium, and titrating potentiometrically with said titrant with vigorous stirring at room temperature to a pH not higher than 10.1. In order to carry out the operation as quickly as possible it is preferable to calculate the volume of titrant beforehand and to use a regulative potentiometer. In order to avoid oxidation, evaporation of the solution is preferably done under diminished pressure in a stream of nitrogen, and precipitates are separated and washed quickly on a centrifuge and dried under diminished pressure at a temperature not higher than 25° C.

For a better understanding of the invention by those skilled in the art the following examples are given by way of illustration.

Example 1.—Preparation for local administration 2.5 g. of nystatin with an activity of 2,884 units per mg. are dissolved in 300 ml. of anhydrous methanol and titrated at room temperature with vigorous stirring with 0.1 N sodium butylate solution in methanol to pH 10.1 by means of an electronic potentiometer Type LP–58 with glass electrode. Instead of lamp potentiometer LP–58 (Yu. S. Lyalikov, "Physico-Chemical Analytical Methods," Publishing House "Khimia," Moscow-Leningrad, 1964, pp. 411–412, there can also be used an electronic potentiometer (pH-meter 44239, Cambridge) with a standard calomel electrode 42526/6 and a solid glass electrode 42516/2 (R. P. Linstead, J. A. Elvidge, M. Whalley, "A Course in Modern Techniques of Organic Chemistry," London, 1955). The indissolved residue is removed by centrifuging and the clarified filtrate evaporated at a pressure of 50 mm. Hg in a stream of nitrogen to $\frac{1}{8}$ to $\frac{1}{10}$ the initial volume. The precipitate which forms is separated, and to the transparent concentrate is added 1.7 to 2.5 times its volume of anhydrous ethyl acetate until it becomes turbid, in order to precipitate impurities of low activity, which are separated by centrifuging. The sodium salt of nystatin is precipitated from the filtrate by the addition of 2.5 to 3.3 times its volume of dry ethyl acetate. The creamy precipitate is separated by centrifuging, washed with small amounts of dry acetone or methylene chloride to remove inactive albonurcin and dried at a pressure of 50 mm. Hg and a temperature not higher than 25° C., 1.6 g. of the sodium salt are obtained, having an activity of 3,337 units per mg., i.e., a yield of 75% on the basis of activity.

Example 2.—Lyophil-dried preparation for intravenous administration and virusological studies 100 g. of nystatin with an activity of 2,500 units per mg. are dissolved in 12 liters of dry methanol and titrated with 14.7 g. of sodium butylate in the form of 0.1 N butanol solution at room temperature and with vigorous stirring, adjusting the pH to 10.1 by means of potentiometer Type EPP–29. Instead of the automatic electronic self-recording apparatus EPP–29 (M. V. Kulakov, S. I. Schepkin, "Automatic Control Equipment for Chemical Industry," Publishing House "Mashgiz," Moscow, 1961, pp. 509–510), there can also be used any self-recording electronic potentiometer having high input resistance, a diagram paper tape and a submerged sensing element of pH-meter (Fig. 332, p. 501) with a glass electrode and high internal resistance. The yield on the basis of activity is 70%. Undissolved impurities are separated on a pressure filter by means of compressed nitrogen. The filtrate is concentrated to $\frac{1}{8}$ its volume in a film evaporator in a stream of nitrogen at a pressure of 20 mm. Hg and with the temperature of the water bath not higher than 35° C. The precipitate of inactive impurities is separated on a pressure filter. The yield on the basis of activity is 60%. Impurities of low activity are precipitated by the addition of 1.7–2.5 volumes of dry ethyl acetate and removed on a pressure filter. The sodium salt of nystatin is precipitated from the filtrate by the addition of 2.5 to 3.3 volumes of ethyl acetate and filtered on a pressure filter. The precipitate is washed with 1.5 liters of dry acetone or methylene chloride and dried in a vacuum drying-oven at a pressure of 50 mm. Hg and a temperature not higher than 25° C. The powder obtained is dissolved in water to give a concentration of 50 mg. per ml. this being done, immediately before freezing. The solution is poured into vials of glass Grade HC–1, 150,000 units per vial (about 1.5 ml.) and subjected to lyophil drying. The vials are then closed with rubber stoppers and aluminum foil caps are crimped onto ensure air-tightness. The yield is 38–46% of the activity of the initial nystatin and not less than 50% by weight.

Example 3.—Preparation of the sodium salt of levorin (antibiotic 26/1 of the candicidin type, heptaene series)

1 g. of crude levorin obtained by the fermentation of Act. levoris Kras and having an activity of 6,400 units per mg., is dissolved in 150 ml. of dry methanol and titrated with 0.1 N sodium butylate solution in methanol to pH 10.1. The undissolved impurities are removed by centrifuging. The filtrate is concentrated to $\frac{1}{10}$ its volume under reduced pressure in a stream of nitrogen, the precipitate which forms is removed and the sodium salt of levorin precipitated from the concentrate with 5 times its volume of ethyl acetate. The precipitate is centrifuged, washed with dry acetone or methylene chloride to remove levoristatin and dried in a vacuum drying-oven. 610 mg. of the sodium salt is obtained, with an activity of 10,240 units per mg., i.e., a yield of 97% on the basis of activity.

Preparations obtained by the application of the present invention are used in particular in medicine and veterinary practice for the treatment of fungal diseases in which the use of the insoluble free polyenes is clinically ineffective. It should be noted that the present invention ensures a five-fold economy of preparations and a corresponding reduction in the cost of treatment.

Furthermore the invention makes it possible to prevent the loss of livestock from coccidiosis, eliminate the contamination of costly nutrient media when growing pure cultures of tissues in the production of vaccines and sera and in microbiological investigations, arrest the fermentation of grape must and prevent rotting of fruit and vegetables and diseases of agricultural crops caused by phytopathogenic fungi. It should likewise be noted that the present invention makes it possible to obtain the sodium salt of polyene antibiotics with a yield of 65–97% on the basis of activity, and more particularly the sodium salt of nystatin with a yield by weight of 60% of the initial nystatin and a yield of the lyophil-dried preparation equal to 38–45% of the activity, when produced on an industrial scale.

Although this invention has been described in a preferred embodiment it will be understood that there may be changes and modifications without departing from the spirit and scope of the invention, as will be apparent to those skilled in the art.

What we claim is:

1. A process for producing the sodium salt of a polyene macrolide antibiotic selected from the group consisting of nystatin and levorin, said process comprising potentiometerically titrating a solution of the said polyene macrolide antibiotic in an anhydrous alcoholic medium with an alcoholic solution of a sodium alcoholate to a pH of at most 10.2, filtering the titrated solution to remove impurities therefrom, concentrating the filtrate under reduced pressure in a nitrogen atmosphere, filtering the thusly concentrated filtrate to remove therefrom further impurities, treating the thusly filtered concentrate with an anhydrous solvent in which the sodium salt is insoluble to precipitate said sodium salt, washing the precipitate of the sodium salt with an organic solvent, dissolving the washed precipitate in water and drying said sodium salt of said polyene macrolide antibiotic under reduced pressure.

2. A process as defined in claim 1 wherein the anhydrous alcoholic medium is anhydrous methanol.

3. A process as defined in claim 1 wherein the sodium alcoholate is sodium butylate in a 0.1 N methanolic solution.

4. A process as defined in claim 1 wherein said anhydrous solvent in which the sodium salt is insoluble is acetic ester.

5. A process as defined in claim 1 wherein said anhydrous solvent in which the sodium salt is insoluble is ethyl acetate.

6. A process as defined in claim 1 wherein the precipitate is washed with acetone.

7. A process as defined in claim 1 wherein the precipitate is washed with methylene chloride.

8. A process as defined in claim 1 wherein said precipitate is dried by lyophilization.

References Cited

UNITED STATES PATENTS

| | | | |
|---|---|---|---|
| 2,786,781 | 3/1957 | Vandeputte et al. | 167—65 |
| 3,244,590 | 4/1966 | Schaffner et al. | 167—65 |

OTHER REFERENCES

Goldberg, Antibiotics, Their Chemistry and Non-Medical Uses, 1959. D. Van Nostrand Co., Inc., pages 122–124.

ALBERT T. MYERS, Primary Examiner

DEREN M. STEPHENS, Assistant Examiner